United States Patent
Fujiike et al.

[11] Patent Number: 6,158,858
[45] Date of Patent: Dec. 12, 2000

[54] METHOD AND APPARATUS FOR MANUFACTURING COLOR FILTER, COLOR FILTER, DISPLAY DEVICE, AND APPARATUS HAVING THE DISPLAY DEVICE

[75] Inventors: Hiroshi Fujiike, Yokohama; Makoto Akahira, Kawasaki; Satoshi Wada, Machida; Yoshitomo Marumoto, Kawasaki; Tadao Saito, Machida, all of Japan

[73] Assignee: Canon Kabushiki Kaisha, Tokyo, Japan

[21] Appl. No.: 09/041,104

[22] Filed: Mar. 12, 1998

[30] Foreign Application Priority Data

Mar. 17, 1997 [JP] Japan ................................. 9-063039

[51] Int. Cl.$^7$ .......................................................... B41J 2/01
[52] U.S. Cl. .......................... 347/105; 347/107; 427/510; 427/511; 430/7
[58] Field of Search .................................... 347/105–107; 427/510–512, 514, 164, 165, 168; 430/7

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,552,192 | 9/1996 | Kashiwazaki et al. ............. 427/511 X |
| 5,593,757 | 1/1997 | Kashiwazaki et al. .................. 347/105 |
| 5,712,064 | 1/1998 | Miyazaki et al. ............................ 430/7 |
| 5,716,740 | 2/1998 | Shiba et al. ................................ 430/7 |
| 5,847,723 | 12/1998 | Akahira et al. ...................... 347/105 X |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |
| 8-82706 | 3/1996 | Japan . |
| 8-327998 | 12/1996 | Japan . |
| 9-21909 | 1/1997 | Japan . |

*Primary Examiner*—William J. Royer
*Attorney, Agent, or Firm*—Fitzpatrick, Cella, Harper & Scinto

[57] ABSTRACT

The color filter manufacturing method for improving precision in correcting color unevenness of a screen surface by eliminating the influence of measurement errors and variance in the ink discharge amount, includes the steps of: coloring a coloring-target medium, using at least two different ink discharge densities, and measuring color densities of colored portions of the coloring-target medium; obtaining a relationship between the color density and ink discharge density based on the respective color densities of the colored portions colored by the at least two different ink discharge densities and corresponding ink discharge densities; and determining an ink discharge density which attains a desired color density based on the obtained relationship between the color density and ink discharge density, and discharging ink onto the color filter substrate at the determined ink discharge density, thereby coloring the color filter substrate.

20 Claims, 15 Drawing Sheets

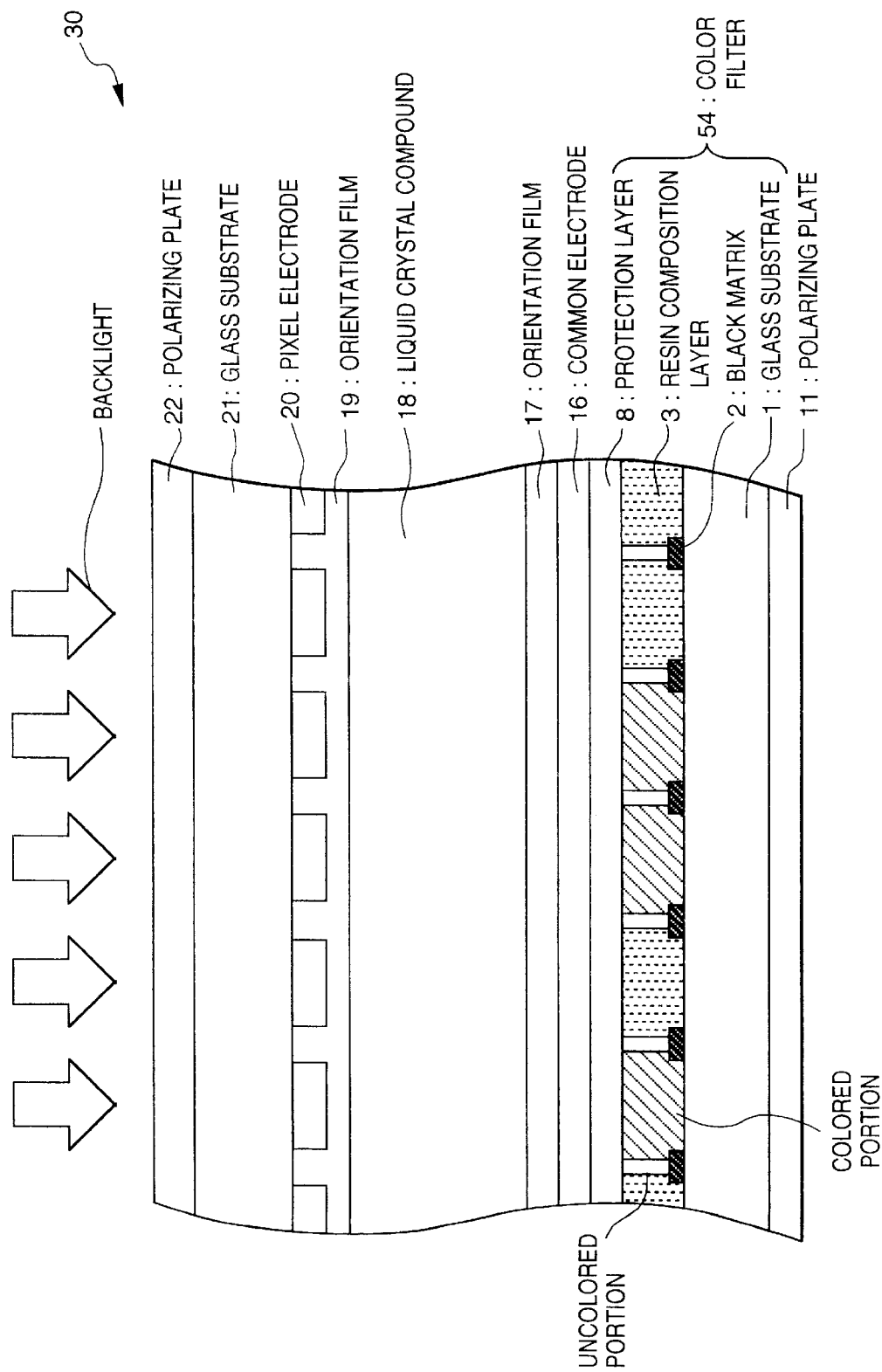

FIG. 18
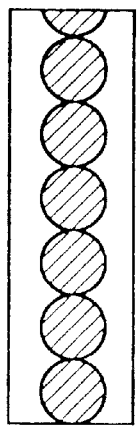
AMOUNT OF INK DISCHARGED PER SINGLE DISCHARGE OPERATION IS SMALL
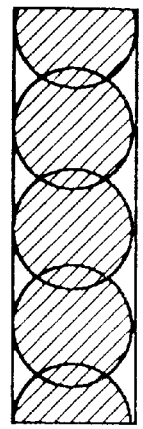
AMOUNT OF INK DISCHARGED PER SINGLE DISCHARGE OPERATION IS LARGE
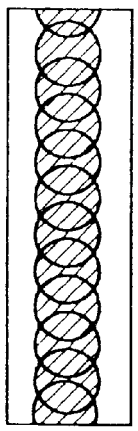
INCREASE INK DISCHARGE DENSITY
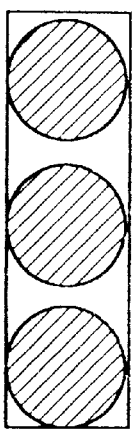
DECREASE INK DISCHARGE DENSITY

METHOD AND APPARATUS FOR MANUFACTURING COLOR FILTER, COLOR FILTER, DISPLAY DEVICE, AND APPARATUS HAVING THE DISPLAY DEVICE

BACKGROUND OF THE INVENTION

The present invention relates to a method and apparatus for manufacturing a color filter by discharging ink onto a substrate by an ink-jet head, a color filter and a display device manufactured by this method and apparatus, and an apparatus having the display device.

When a color filter is manufactured by discharging ink onto a substrate to color each pixel by using an ink-jet head, plural nozzles are usually used to reduce the time required for coloring. In this case, since the amount of ink discharged at a single time of electric signal (hereinafter referred to as ink discharge amount) is generally different for each nozzle, pixels colored by different nozzles have different degrees of coloring. Therefore, this causes color unevenness on the screen surface.

In view of this, the inventors of the present invention have already suggested a method of minimizing the aforementioned color unevenness, in which discharge operation is performed by the ink-jet head to be used for coloring, unevenness of the ink discharge amount of each nozzle is measured, and the ink discharge density is adjusted in accordance with the measured unevenness. For instance, as shown in FIG. 18, for a nozzle whose amount of ink discharged per single discharge operation is small, the ink discharge density is set large; whereas for a nozzle whose amount of ink discharged per single discharge operation is large, the ink discharge density is set small. In this manner, unevenness of the amount of ink discharged per single discharge operation of each nozzle is corrected by adjusting the ink discharge density of each nozzle. Accordingly, the amount of ink discharged for each pixel is made uniform. It is considered that if the ink discharged for a pixel uniformly spreads out in the pixel, a color filter without color unevenness is manufactured.

The method of adjusting the ink discharge density will be described hereinafter.

Light transmitted through a colored portion of a color filter is expressed by the following equation according to the Lambert-Beer's Law:

$$A = -\text{Log}(I/I0) = abc$$

A: absorbance
I0: intensity of incident light
I: intensity of transmitted light
I/I0: transmissivity
a: proportional constant
b: thickness of colored portion
c: density of dye in colored portion To minimize the color unevenness, in the above equation, I/I0 must be constant for each colored portion of the color filter. "bc" in the right side of the equation expresses the amount of ink discharged per unit area.

The following two points become apparent from the above equation.
(1) To eliminate the color unevenness, it is necessary to make the absorbance uniform in the colored portion of the entire surface of the filter.
(2) The amount of ink per unit area and absorbance are proportional.

Herein, actual discharge operation is performed by an ink-jet head to be used, the ink discharge amount of each nozzle is obtained, and the number of ink dots discharged per unit area (hereinafter referred to as ink discharge density) is determined by the following equation:

$$\text{ink discharge density} = \text{amount of ink discharged per unit area} / \text{amount of ink discharged per single discharge operation}$$

However, it has been discovered that the precision of the color unevenness correction of a screen surface is not always sufficient in the above example. The main causes thereof are the following two points which are classified based on the mechanism of imprecise correction.
(1) measurement error of absorbance
(2) even if an accurate discharge amount at a certain moment is obtained, because of subtle changes in the ink discharge amount which is inherent to an ink-jet head, ink is not always discharged at the obtained amount, but discharged with variances.

Furthermore, these two causes are classified into the following two components if classification is based on their influence.
(1) Always constant component
An always constant component includes, for instance, measurement error generated at the time of measuring absorbance due to the fact that the absorbance of the colored portion is influenced by the absorbance of the background portion, which is the portion other than the colored portion.
(2) Random varying component
A random varying component includes, for instance, real-time variation of ink discharge amount due to changes in the state of the ink-jet head or nozzle.

SUMMARY OF THE INVENTION

The present invention has been made in consideration of the above situation, and has as its object to provide a method and apparatus for manufacturing a color filter which can improve precision in correcting color unevenness of a screen surface by eliminating the influence of measurement errors and variance in an ink discharge amount.

Furthermore, another object of the present invention is to provide a color filter and a display device manufactured by the above manufacturing method and apparatus, and an apparatus having the display device.

To solve the above-described problems and to attain the above objects, the color filter manufacturing method according to the first aspect of the present invention is characterized by the following.

More specifically, the present invention provides a method of manufacturing a color filter by scanning an ink-jet head relative to a color filter substrate and discharging ink from the ink-jet head onto the color filter substrate to color the color filter substrate, comprising: a measuring step of coloring a coloring-target medium, using at least two different ink discharge densities, and measuring color densities of colored portions of the coloring-target medium; an operation step of obtaining a relationship between color density and ink discharge density based on the respective color densities of the colored portions colored by the at least two different ink discharge densities and corresponding ink discharge densities; and a coloring step of determining an ink discharge density which attains a desired color density based on the obtained relationship between color density and ink discharge density, and discharging ink onto the color filter substrate at the determined ink discharge density, thereby coloring the color filter substrate.

Furthermore, the color filter manufacturing method according to the second aspect of the present invention is characterized by the following.

More specifically, the present invention provides a method of manufacturing a color filter by scanning an ink-jet head relative to a color filter substrate and discharging ink from the ink-jet head onto the color filter substrate to color the color filter substrate, comprising: a measuring step of obtaining a relationship between a gradient of a straight line, representing a relationship between an amount of ink discharged in a fixed area and ink discharge density, and an amount of ink discharged per single discharge operation; an operation step of obtaining an ink discharge density necessary for coloring the color filter based on the result of measuring the amount of ink discharged per single discharge operation of each ink discharge nozzle of the ink-jet head and the relationship obtained in the measuring step; and a coloring step of discharging ink onto the color filter substrate while changing ink discharge density for each nozzle of the ink-jet head based on the ink discharge density obtained in the operation step, thereby coloring the color filter substrate.

Furthermore, the color filter manufacturing apparatus according to the first aspect of the present invention is characterized by having the following configuration.

More specifically, the present invention provides an apparatus for manufacturing a color filter by scanning an ink-jet head relative to a color filter substrate and discharging ink from the ink-jet head onto the color filter substrate to color the color filter substrate, comprising: measuring means for coloring a coloring-target medium, using at least two different ink discharge densities, and measuring color densities of colored portions of the coloring-target medium; operation means for obtaining a relationship between color density and ink discharge density based on the respective color densities of the colored portions colored by the at least two different ink discharge densities and corresponding ink discharge densities; and coloring means for determining an ink discharge density which attains a desired color density based on the obtained relationship between color density and ink discharge density, and discharging ink onto the color filter substrate at the determined ink discharge density, thereby coloring the color filter substrate.

Furthermore, the color filter manufacturing apparatus according to the second aspect of the present invention is characterized by having the following configuration.

More specifically, the present invention provides an apparatus for manufacturing a color filter by scanning an ink-jet head relative to a color filter substrate and discharging ink from the ink-jet head onto the color filter substrate to color the color filter substrate, comprising: measuring means for, obtaining a relationship between a gradient of a straight line, representing a relationship between an amount of ink discharged in a fixed area and ink discharge density, and an amount of ink discharged per single discharge operation; operation means for obtaining an ink discharge density necessary for coloring the color filter based on the result of measuring the amount of ink discharged per single discharge operation of each ink discharge nozzle of the ink-jet head and the relationship obtained by the measuring means; and coloring means for discharging ink onto the color filter substrate while changing ink discharge density for each nozzle of the ink-jet head based on the ink discharge density obtained by the operation means, thereby coloring the color filter substrate.

Furthermore, the color filter according to the first aspect of the present invention is characterized by the following configuration.

More specifically, the present invention provides a color filter manufactured by scanning an ink-jet head relative to a color filter substrate and discharging ink from the ink-jet head onto the color filter substrate to color the color filter substrate, the color filter being manufactured by: a measuring step of coloring a coloring-target medium, using at least two different ink discharge densities, and measuring color densities of colored portions of the coloring-target medium; an operation step of obtaining a relationship between color density and ink discharge density based on the respective color densities of the colored portions colored by the at least two different ink discharge densities and corresponding ink discharge densities; and a coloring step of determining an ink discharge density which attains a desired color density based on the obtained relationship between color density and ink discharge density, and discharging ink onto the color filter substrate at the determined ink discharge density, thereby coloring the color filter substrate.

Furthermore, the display device according to the first aspect of the present invention is characterized by having the following configuration.

More specifically, the present invention provides a display device having a color filter manufactured by scanning an ink-jet head relative to a color filter substrate and discharging ink from the ink-jet head onto the color filter substrate to color the color filter substrate, the display device integratedly comprising: the color filter manufactured by: a measuring step of coloring a coloring-target medium, using at least two different ink discharge densities, and measuring color densities of colored portions of the coloring-target medium; an operation step of obtaining a relationship between color density and ink discharge density based on the respective color densities of the colored portions colored by the at least two different ink discharge densities and corresponding ink discharge densities; and coloring step of determining an ink discharge density which attains a desired color density based on the obtained relationship between color density and ink discharge density, and discharging ink onto the color filter substrate at the determined ink discharge density, thereby coloring the color filter substrate, and light amount variable means for enabling to vary an amount of light.

Furthermore, the apparatus having the display device according to the first aspect of the present invention is characterized by the following configuration.

More specifically, the present invention provides an apparatus including a display device having a color filter manufactured by scanning an ink-jet head relative to a color filter substrate and discharging ink from the ink-jet head onto the color filter substrate to color the color filter substrate, the apparatus integratedly comprising: the display device integratedly comprising: the color filter manufactured by: a measuring step of coloring a coloring-target medium, using at least two different ink discharge densities, and measuring color densities of colored portions of the coloring-target medium; an operation step of obtaining a relationship between color density and ink discharge density based on the respective color densities of the colored portions colored by the at least two different ink discharge densities and corresponding ink discharge densities; and a coloring step of determining an ink discharge density which attains a desired color density based on the obtained relationship between color density and ink discharge density, and discharging ink onto the color filter substrate at the determined ink discharge density, thereby coloring the color filter substrate, and light amount variable means for enabling to vary an amount of light; and image signal supply means for supplying an image signal to the display device.

Furthermore, the color filter according to the second aspect of the present invention is characterized by the following configuration.

More specifically, the present invention provides a color filter manufactured by scanning an ink-jet head relative to a color filter substrate and discharging ink from the ink-jet head onto the color filter substrate to color the color filter substrate, the color filter being manufactured by: a measuring step of obtaining a relationship between a gradient of a straight line, representing a relationship between an amount of ink discharged in a fixed area and ink discharge density, and an amount of ink discharged per single discharge operation; an operation step of obtaining an ink discharge density necessary for coloring the color filter based on the result of measuring the amount of ink discharged per single discharge operation of each ink discharge nozzle of the ink-jet head and the relationship obtained in the measuring step; and a coloring step of discharging ink onto the color filter substrate while changing ink discharge density for each nozzle of the ink-jet head based on the ink discharge density obtained in the operation step, thereby coloring the color filter substrate.

Furthermore, the display device according to the second aspect of the present invention is characterized by the following configuration.

More specifically, the present invention provides a display device having a color filter manufactured by scanning an ink-jet head relative to a color filter substrate and discharging ink from the ink-jet head onto the color filter substrate to color the color filter substrate, the display device integratedly comprising: the color filter manufactured by: a measuring step of obtaining a relationship between a gradient of a straight line, representing a relationship between an amount of ink discharged in a fixed area and ink discharge density, and an amount of ink discharged per single discharge operation; an operation step of obtaining an ink discharge density necessary for coloring the color filter based on the result of measuring the amount of ink discharged per single discharge operation of each ink discharge nozzle of the ink-jet head and the relationship obtained in the measuring step; and a coloring step of discharging ink onto the color filter substrate while changing ink discharge density for each nozzle of the ink-jet head based on the ink discharge density obtained in the operation step, thereby coloring the color filter substrate, and light amount variable means for enabling to vary an amount of light.

Furthermore, the apparatus having the display device according to the second aspect of the present invention is characterized by the following configuration.

More specifically, the present invention provides an apparatus including a display device having a color filter manufactured by scanning an ink-jet head relative to a color filter substrate and discharging ink from the ink-jet head onto the color filter substrate to color the color filter substrate, the apparatus integratedly comprising: the display device integratedly comprising: the color filter manufactured by: a measuring step of obtaining a relationship between a gradient of a straight line, representing a relationship between an amount of ink discharged in a fixed area and ink discharge density, and an amount of ink discharged per single discharge operation; an operation step of obtaining an ink discharge density necessary for coloring the color filter based on the result of measuring the amount of ink discharged per single discharge operation of each ink discharge nozzle of the ink-jet head and the relationship obtained in the measuring step; and a coloring step of discharging ink onto the color filter substrate while changing ink discharge density for each nozzle of the ink-jet head based on the ink discharge density obtained in the operation step, thereby coloring the color filter substrate, and light amount variable means for enabling to vary an amount of light; and image signal supply means for supplying an image signal to the display device.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a cross section showing the basic structure of a color liquid crystal display apparatus incorporating the color filter according to the embodiment of the present invention;

FIG. 18 is an explanatory view showing how the unevenness of the amount of ink per single discharge operation of each nozzle is corrected by adjusting ink discharge density for each nozzle.

DETAILED DESCRIPTION OF THE PREFERRED EMBODIMENTS

Preferred embodiments of the present invention will be described in detail in accordance with the accompanying drawings.

<First Embodiment>

Figure 1:
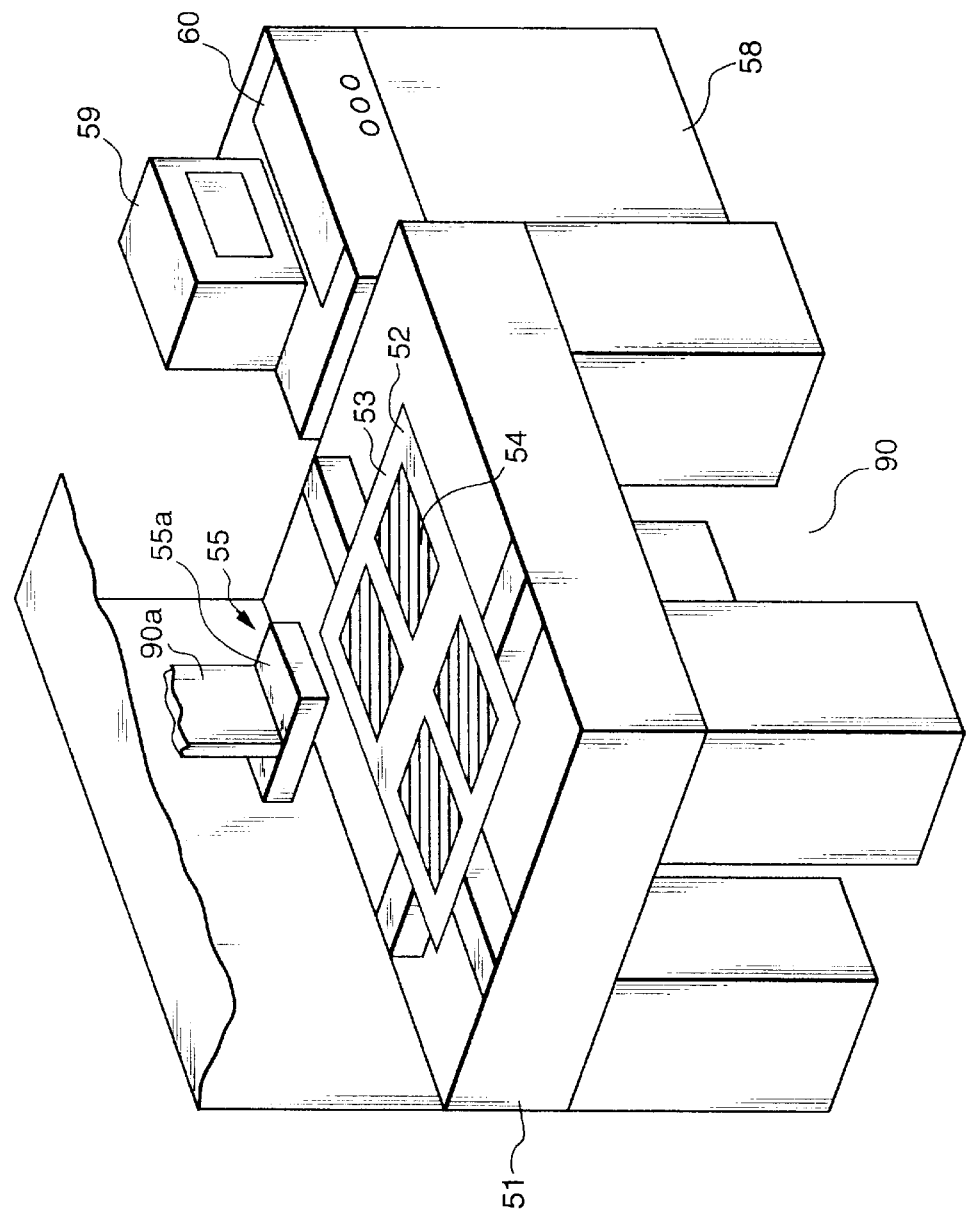
FIG. 1 is a perspective view showing the structure of a color-filter manufacturing apparatus according to an embodiment of the present invention.

FIG. 1 is a perspective view showing the structure of a color-filter manufacturing apparatus according to an embodiment of the present invention.

In FIG. 1, reference numeral 51 denotes a platform of the apparatus; 52, an XY θ stage provided on the platform 51; 53, a color-filter substrate set on the XY θ stage 52; 54, a color filter formed on the color-filter substrate 53; 55, a head unit including R (red), G (green) and B (blue) ink-jet heads for coloring the color filter 54 and a head mount 55a supporting the inkjet heads; 58, a controller which controls the overall operation of a color-filter manufacturing apparatus 90; 59, a teaching pendant (personal computer) as a display unit of the controller 58; and 60, a keyboard as an operation unit of the teaching pendant 59. The head unit 55 is detachably mounted to a supporting portion 90a of a color-filter manufacturing apparatus 90, with an adjustable rotation angle with respect to the horizontal surface direction.

Figure 2:
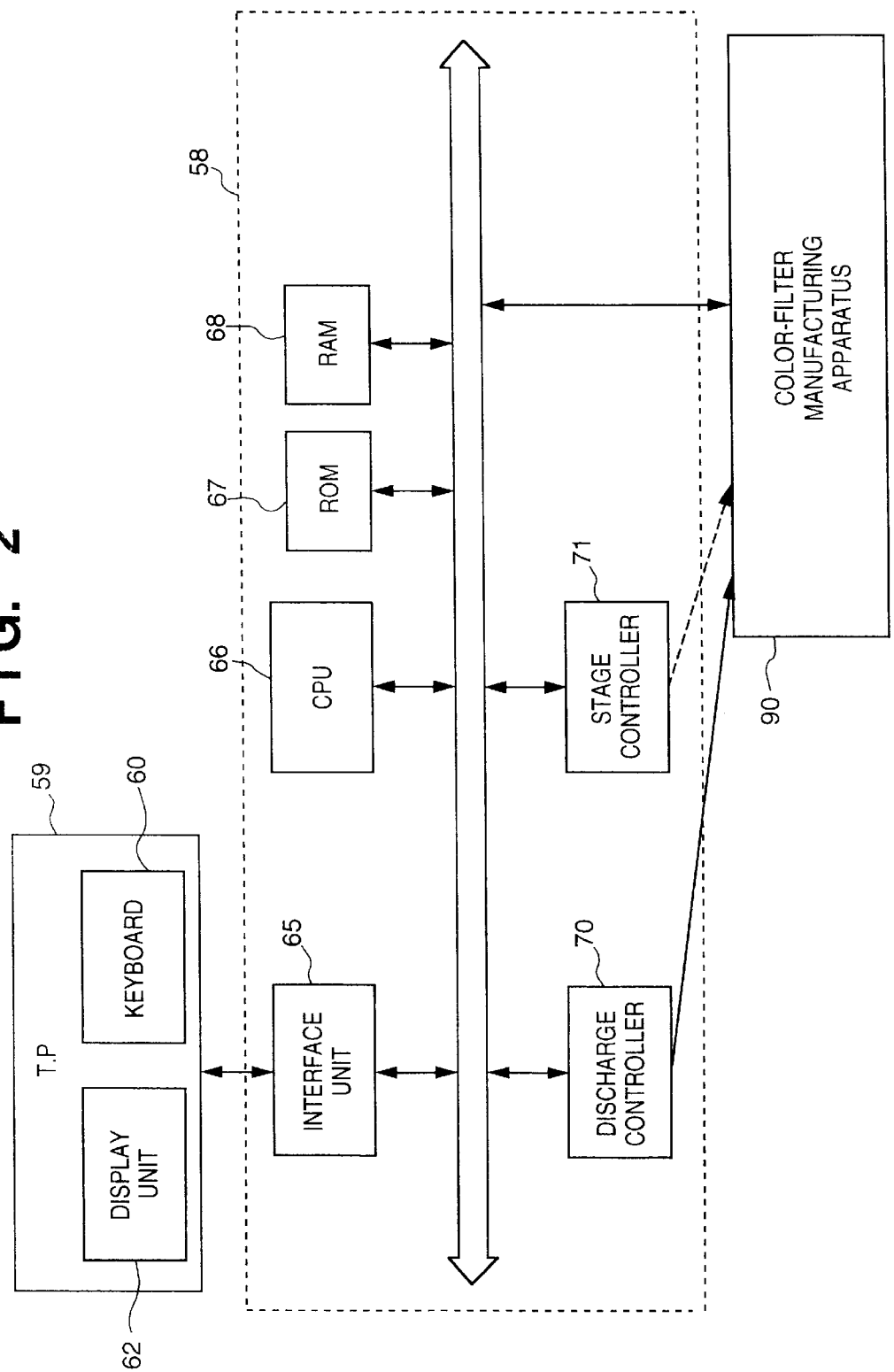
FIG. 2 is a block diagram showing the construction of a controller which controls the operation of the color-filter manufacturing apparatus.

FIG. 2 is a block diagram showing the construction of a controller which controls the operation of the color-filter manufacturing apparatus 90. In FIG. 2, the teaching pendant 59 serves as input/output means of the controller 58. Numeral 62 denotes a display unit which displays information on the progress of manufacturing process, presence/absence of abnormality of the ink-jet head and the like. The keyboard 60 serves as an operation unit for instructing the operation and the like of the color-filter manufacturing apparatus 90.

Reference numeral 58 denotes a controller which controls the overall operation of the color-filter manufacturing apparatus 90; 65, an interface unit for receiving/sending data with respect to the teaching pendant 59; 66, a CPU which controls the color-filter manufacturing apparatus 90; 67, a ROM in which control programs for operating the CPU 66 are stored; 68, a RAM in which production information and the like are stored; 70, a discharge controller which controls ink discharge to respective pixels of a color filter; 71, a stage controller which controls the operation of the XY θ stage 52. The color-filter manufacturing apparatus 90 is connected to the controller 58, and operates in accordance with instructions from the controller 58.

Figure 3:
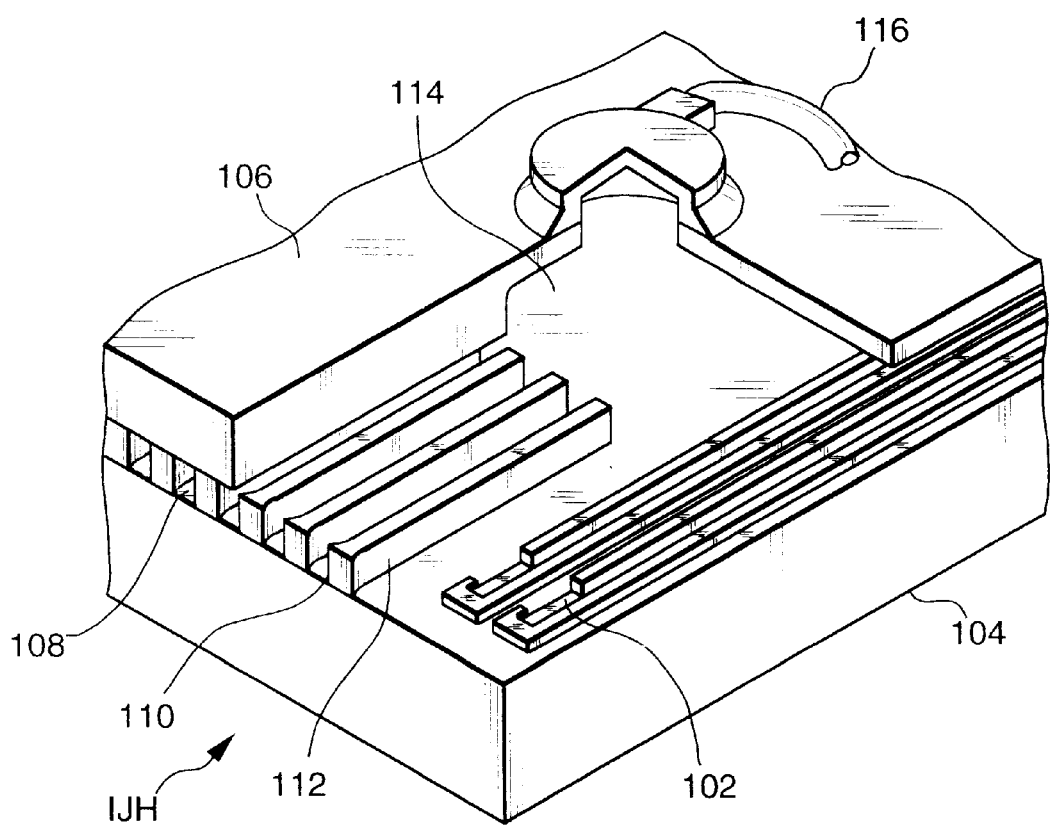
FIG. 3 is a perspective view showing the structure of an ink-jet head used in the color-filter manufacturing apparatus.

FIG. 3 is a perspective view showing the structure of the ink-jet head IJH used in the above color-filter manufacturing apparatus 90. In FIG. 1, the three ink-jet heads IJH are provided in correspondence to the three, R, G and B colors, however, as the three heads have the same structure, FIG. 3 shows the structure of one of these heads.

In FIG. 3, the ink-jet head IJH mainly comprises a heater board 104 as a base plate, a plurality of heaters 102 formed on the heater board 104, and a top plate 106 placed on the heater board 104. A plurality of discharge orifices 108 are formed on the top plate 106, and tunnel-like liquid channels 110 connected to the discharge orifices 108 are formed at the rear of the discharge orifices 108. The respective liquid channels 110 are separated from each other by partition walls 112. The liquid channels 110 are connected to a common ink chamber 114 at the rear of the liquid channels. Ink is supplied to the ink chamber 114 via an ink supply port 116, and the ink is supplied from the ink chamber 114 to the respective liquid channels 110.

The heater board 104 and the top plate 106 are assembled such that the respective heaters 102 are positioned correspondingly to the respective liquid channels 110, as shown in FIG. 3. Although FIG. 3 only shows two heaters 102, the heaters 102 are respectively provided in correspondence to the respective liquid channels 110. In the assembled state as shown in FIG. 3, when a predetermined drive pulse is applied to the heaters 102, the ink on the heaters 102 is boiled to form bubbles, and the ink is pressed due to volume expansion of the bubbles and discharged from the discharge orifices 108. Accordingly, the size of the bubbles can be controlled by controlling the drive pulse, e.g., the level of electric power, applied to the heaters 102. Thus, the volume of the ink discharged from the discharge orifices can be freely controlled.

FIGS. 4A to 4F are cross-sectional views showing an example of a color-filter manufacturing process.

Although a glass substrate is generally used as a substrate 1 in the present embodiment, it is not limited to a glass substrate as long as the substrate has necessary characteristics to be used as a liquid crystal color filter, e.g., transparency, mechanical strength and the like.

Figure 4A:
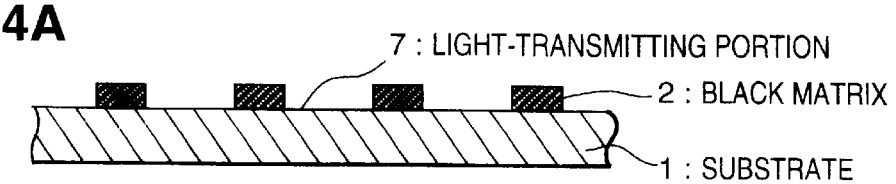
FIGS. 4A to 4F are cross sections showing the color-filter manufacturing process.
Figure 4B:
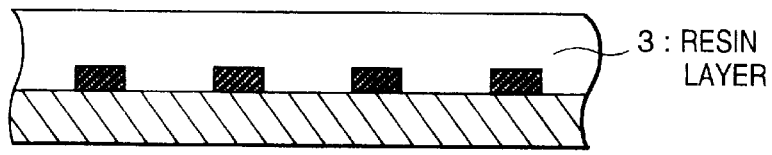

FIG. 4A shows the glass substrate 1 having a light-transmitting portion 7 and a black matrix 2 as a light-shielding portion. First, resin composition, which is set by irradiation of light or a combination of irradiation of light and heating, and which has ink acceptability, is coated on the substrate 1 on which the black matrix 2 is formed, and prebaking is performed in accordance with necessity to form a resin layer 3 (FIG. 4B). The resin layer 3 can be formed by various coating methods such as spin coating, roll coating, bar coating, spray coating and dip coating, and the formation of the resin layer 3 is not limited to any specific method.

Figure 4C:
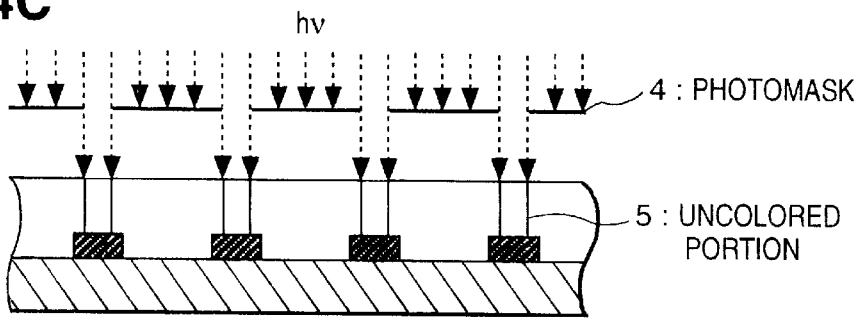
Figure 4D:
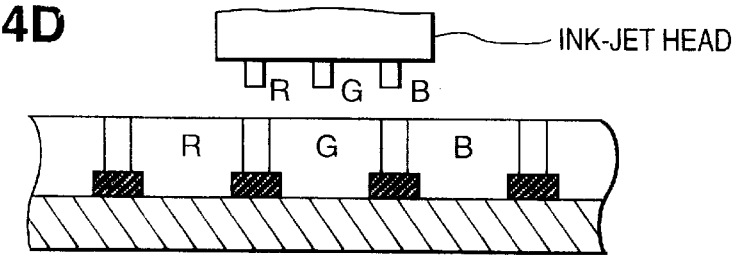
Figure 4E:
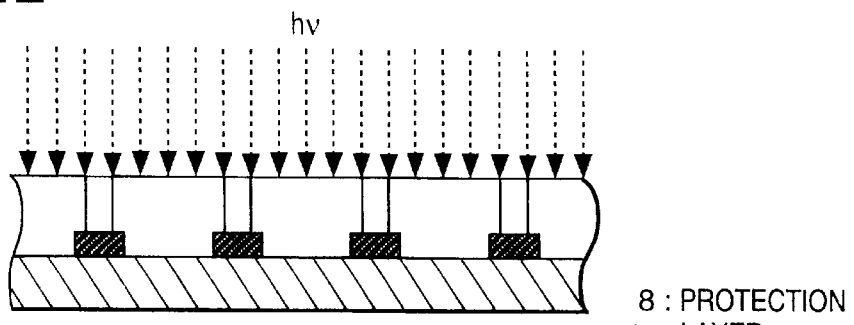

Next, a part of the resin layer 3 is set to form a non-absorptive portion 5 (uncolored portion) by performing pattern exposure by utilizing a photomask 4, on the resin layer in advance at a portion light-shielded by the black matrix 2 (FIG. 4C). Then, the resin layer 3 is colored with respective R, G and B colors by the ink-jet head (FIG. 4D), and the ink is dried in accordance with necessity.

In the pattern exposure, a photomask 4 having openings for curing the light-shielded portions by the black matrix 2 is employed. At this time, to prevent occurrence of an uncolored portion at a portion which abuts on the black matrix 2, it is necessary to apply a relatively large amount of ink to such portion. For this purpose, the photomask 4 has openings greater than the width (light-shielding width) of the black matrix 2.

As the ink used for coloring, dyes and pigments are both available, and further, both liquid ink and solid ink are available.

As a curable resin composition employed in the present invention, any composition can be used as long as it has ink acceptability, and it can be set by at least one of irradiation of light and heating. For example, resins such as acrylic resins, epoxy resins, silicone resins, cellulose derivatives such as hydroxypropyl cellulose, hydroxyethyl cellulose, methylcellulose, carboxymethyl cellulose or degenerated materials thereof can be employed.

To advance cross-linking reaction by light or light and heat, a photo-initiator (cross-linking agent) can be employed. As the cross-linking agent, bichromate, bisazide, radical initiator, cationic initiator, anionic initiator and the like can be employed. Further, these photo-initiators can be mixed or they can be combined with other sensitizers. To further advance the cross-linking reaction, heating processing can be performed after irradiation of light.

The resin layer including the above compositions has excellent thermal resistance and water resistance so as to sufficiently endure high temperature post-process or cleaning process.

As the ink-jet method used in the present invention, a bubble-jet type method using an electrothermal transducer as an energy generating element, or a piezo-jet type method using a piezoelectric element can be employed. The size of the colored area and the coloring pattern can be arbitrarily set.

Moreover, although the present embodiment shows an example where the black matrix is formed on the substrate, the black matrix may be formed on the resin layer after the curable resin composition layer is formed or after coloring is performed, and the form thereof is not limited to that of the present embodiment. Further, for the forming method of the black matrix, it is preferable that a metal thin film is formed on a substrate by sputtering or deposition method and patterning is performed by a photolithography process. However, the forming method is not limited to this.

Figure 4F:
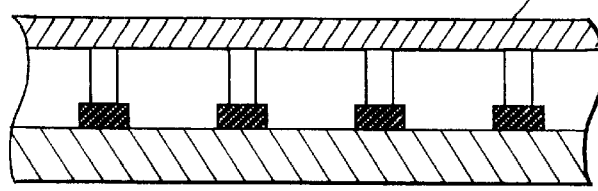

Next, the resin composition is set by only irradiation of light, only heating processing, or irradiation of light and heating processing (FIG. 4E), and a protection layer 8 is formed in accordance with necessity (FIG. 4F). Note that in FIGS. 4A to 4F, sign hv denotes the intensity of light. In case of heating processing, the resin layer is set by heat instead of light of the intensity hv. The protection layer 8 is formed by using a second resin composition of photo-setting type, heat-setting type or photo- and heat-setting type, or by vapor deposition or sputtering using inorganic material. Any material can be used to form the protection layer 8 as long as it has transparency and sufficient durability at ITO formation process, orientation film formation process and the like performed thereafter.

FIG. 5 is a cross section showing the basic structure of a color liquid crystal display apparatus 30 incorporating the above-described color filter.

Generally, the color liquid-crystal display device is formed by assembling the color filter substrate 1 and an opposing substrate 21 and filling liquid crystal compound 18 between them. On the inner surface of the substrate 21, a TFT (not shown) and transparent pixel electrodes are formed in matrix. On the inner surface of the substrate 1, the color filter 54 is provided such that the R, G and B colored portions can be positioned corresponding to each of the pixel electrodes. A transparent counter electrode (common electrode) 16 is formed on the entire surface of the color filter 54. Generally, the black matrix 2 is formed on the color filter substrate 1 side. Further, an orientation film 19 is formed on the surfaces of the both substrates 1 and 21. Liquid-crystal molecules can be oriented in a uniform direction by rubbing processing on the orientation film 19. Further, polarizing plates 11 and 22 are attached to the outer surfaces of the respective glass substrates. The liquid crystal compound 18 is filled in the joint clearance (about 2 to 5 $\mu$m) between these glass substrates. As a backlight, the combination of a fluorescent light (not shown) and a light-scattering plate (not shown) is generally used. The liquid-crystal compound functions as an optical shutter to change transmissivity of the backlight, which realizes display.

A case where the above liquid crystal display device is applied to an information processing apparatus will be described below with reference to FIGS. 6 to 8.

Figure 6:
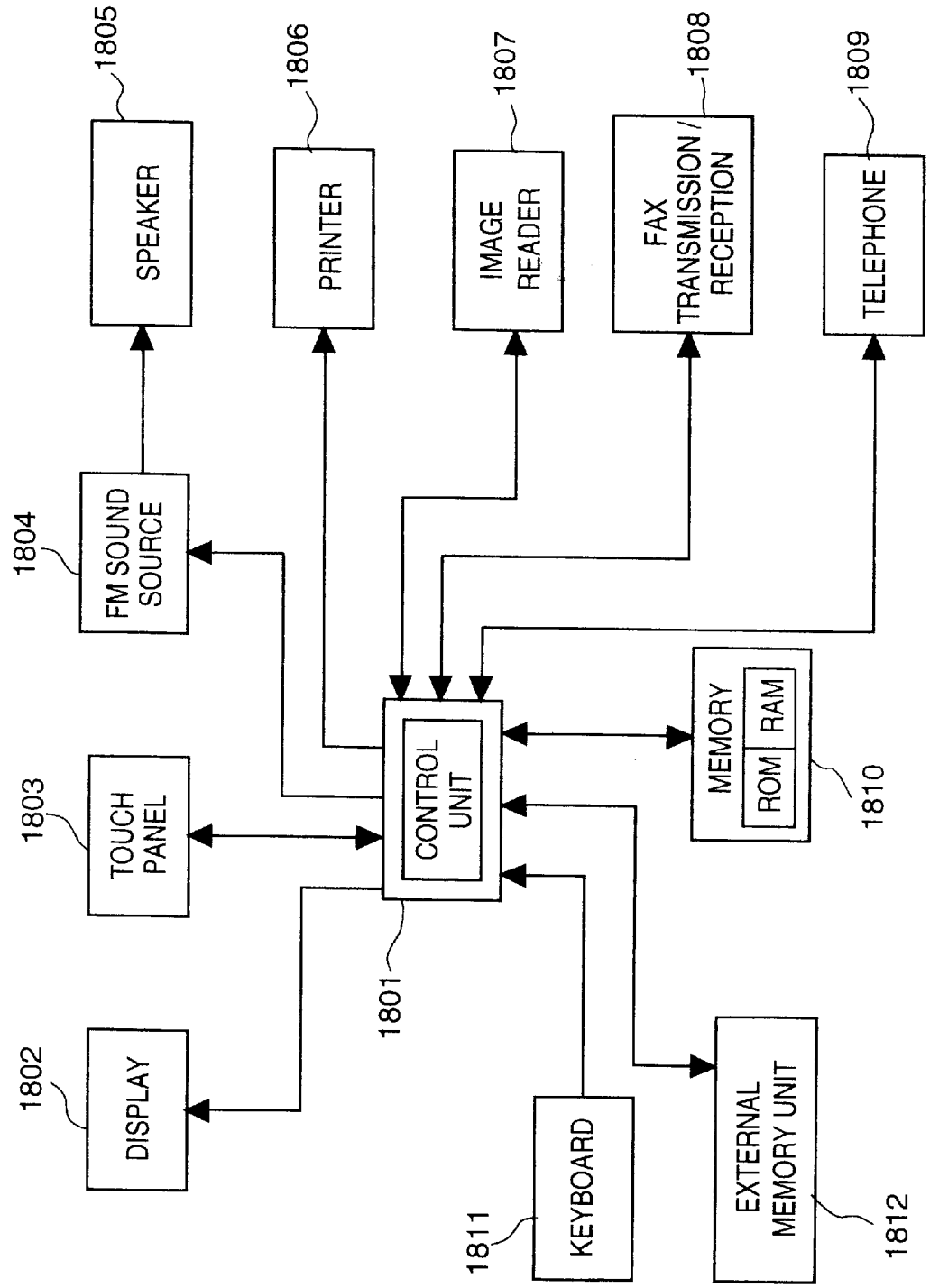
FIG. 6 is a block diagram showing an information processing apparatus to which the liquid crystal display device is applied.

FIG. 6 is a block diagram showing the schematic arrangement of an information processing apparatus serving as a word processor, a personal computer, a facsimile apparatus, and a copying machine, to which the above liquid crystal display device is applied.

Referring to FIG. 6, reference numeral 1801 denotes a control unit for controlling the overall apparatus. The control unit 1801 includes a CPU such as a microprocessor and various I/O ports, and performs control by outputting/inputting control signals, data signals, and the like to/from the respective units. Reference numeral 1802 denotes a display unit for displaying various menus, document information, and image data read by an image reader unit 1807, and the like on the display screen; 1803, a transparent, pressure-sensitive touch panel mounted on the display unit 1802. By pressing the surface of the touch panel 1803 with a finger or the like, an item input operation, a coordinate position input operation, or the like can be performed on the display unit 1802.

Reference numeral 1804 denotes an FM (Frequency Modulation) sound source unit for storing music information, created by a music editor or the like, in a memory unit 1810 or an external memory unit 1812 as digital data, and reading out the information from such a memory, thereby performing FM modulation of the information. Electrical signals from the FM sound source unit 1804 are converted into audible sound by a speaker unit 1805. A printer unit 1806 is used as an output terminal for a word processor, a personal computer, a facsimile apparatus, and a copying machine.

Reference numeral 1807 denotes an image reader unit for photoelectrically reading original data. The image reader unit 1807 is arranged midway along the original convey passage and designed to read originals for facsimile and copy operations, or other various originals.

Reference numeral 1808 denotes a transmission/reception unit for the facsimile (FAX) apparatus. The transmission/reception unit 1808 transmits original data read by the image reader unit 1807 by facsimile, and receives and decodes facsimile signals. The transmission/reception unit 1808 has an interface function for external units. Reference numeral 1809 denotes a telephone unit having a general telephone function and various telephone functions such as an answering function.

Reference numeral 1810 denotes a memory unit including a ROM for storing system programs, manager programs, application programs, fonts, and dictionaries, a RAM for storing an application program loaded from the external memory unit 1812 and document information, a video RAM, and the like.

Reference numeral 1811 denotes a keyboard unit for inputting document information and various commands.

Reference numeral 1812 denotes an external memory unit using a floppy disk, a hard disk, and the like. The external memory unit 1812 serves to store document information, music and speech information, application programs for the user, and the like.

Figure 7:
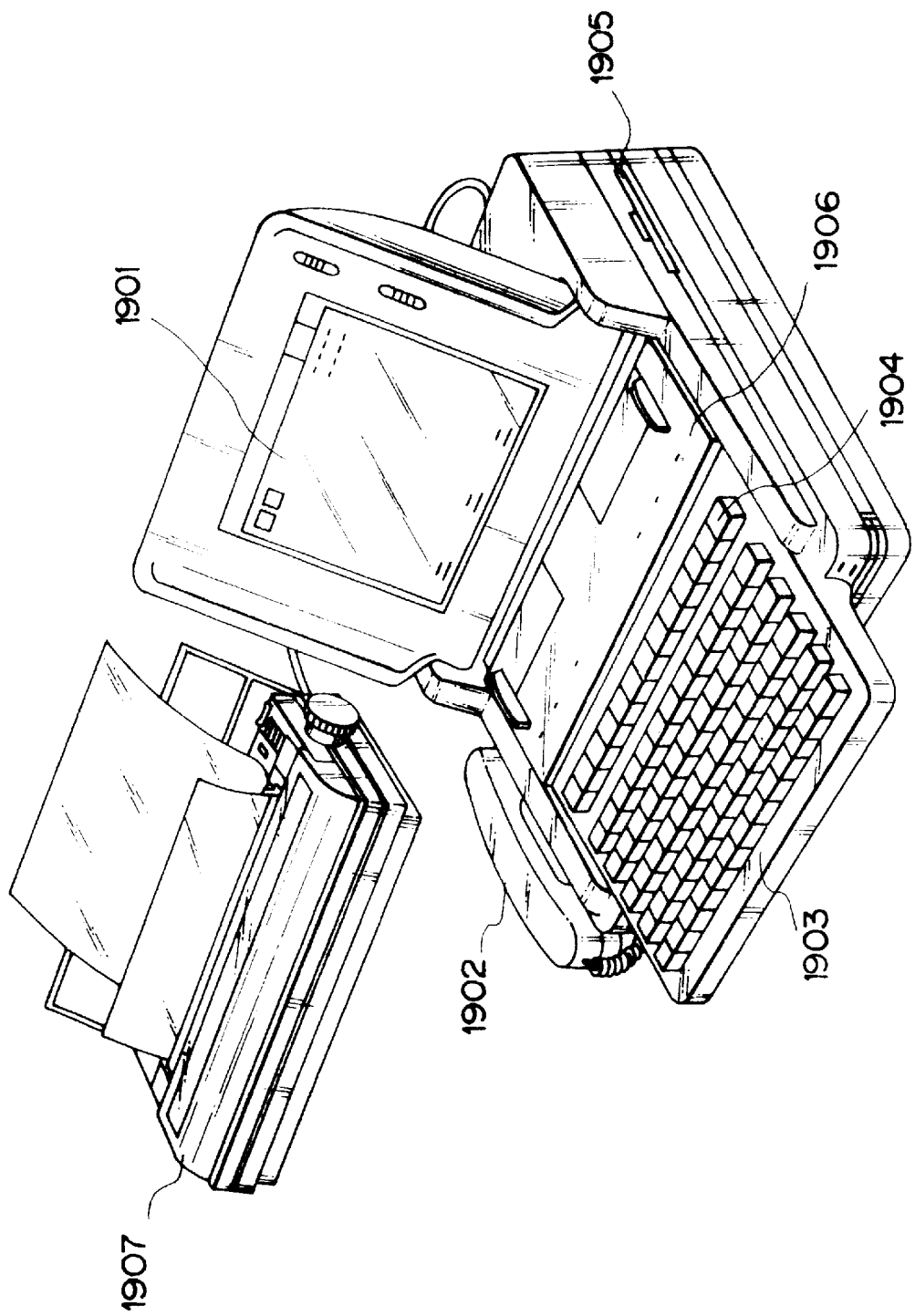
FIG. 7 is a perspective view of the information processing apparatus to which the liquid crystal display device is applied.

FIG. 7 is a perspective view of the information processing apparatus in FIG. 6.

Referring to FIG. 7, reference numeral 1901 denotes a flat panel display using the above liquid crystal display device, which displays various menus, graphic pattern information, document information, and the like. A coordinate input or item designation input operation can be performed on the flat panel display 1901 by pressing the surface of the touch panel 1803 with a finger of the user or the like. Reference numeral 1902 denotes a handset used when the apparatus is used as a telephone set. A keyboard 1903 is detachably connected to the main body via a cord and is used to perform various document functions and input various data. This keyboard 1903 has various function keys 1904. Reference numeral 1905 denotes an insertion port through which a floppy disk is inserted into the external memory unit 1812.

Reference numeral 1906 denotes an original insertion table on which an original to be read by the image reader unit 1807 is placed. The read original is discharged from the rear portion of the apparatus. In a facsimile receiving operation or the like, received data is printed by an ink-jet printer 1907.

In a case where the above information processing apparatus serves as a personal computer or a word processor, various kinds of information input through the keyboard unit 1811 are processed by the control unit 1801 in accordance with a predetermined program, and the resultant information is output, as an image, to the printer unit 1806.

In a case where the information processing apparatus serves as a receiver of the facsimile apparatus, facsimile information input through the transmission/reception unit 1808 via a communication line is subjected to reception processing in the control unit 1801 in accordance with a predetermined program, and the resultant information is outputted, as a received image, to the printer unit 1806.

In a case where the information processing apparatus serves as a copying machine, an original is read by the image reader unit 1807, and the read original data is output, as an image to be copied, to the printer unit 1806 via the control unit 1801. Note that in a case where the information processing apparatus serves as a transmitter of the facsimile apparatus, original data read by the image reader unit 1807 is subjected to transmission processing in the control unit 1801 in accordance with a predetermined program, and the resultant data is transmitted to a communication line via the transmission/reception unit 1808.

Figure 8:
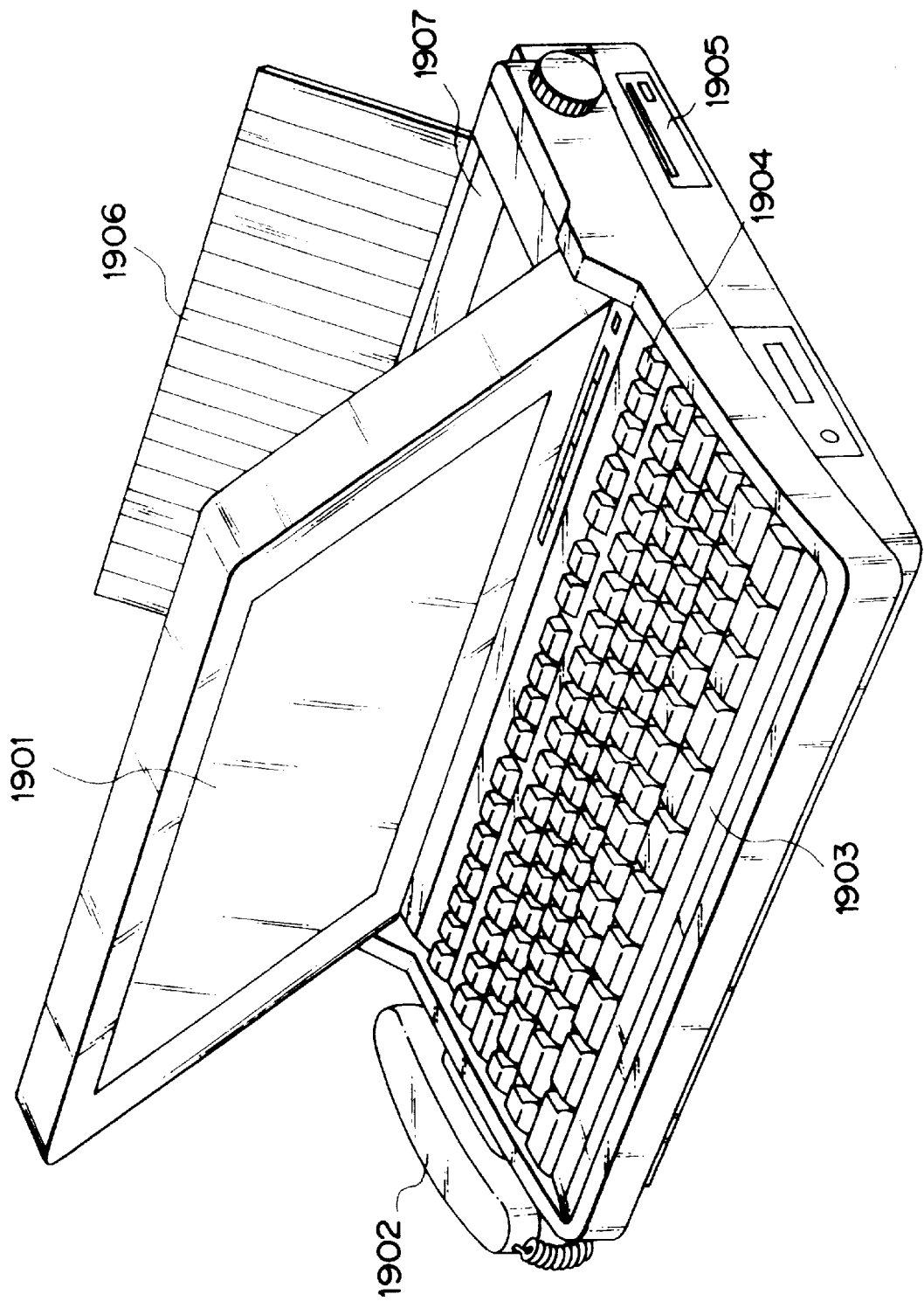
FIG. 8 is a perspective view of the information processing apparatus to which the liquid crystal display device is applied.

Note that the above information processing apparatus may be designed as an integrated apparatus incorporating an ink-jet printer in the main body, as shown in FIG. 8. In this case, the portability of the apparatus can be improved. The same reference numerals in FIG. 8 denote parts having the same functions as those in FIG. 7.

Next, overall description of the characteristic portion of the present embodiment will be given.

In the present embodiment, the ink discharge density (the number of ink dots discharged per unit area) of each nozzle of the ink-jet head having plural ink discharge nozzles is adjusted based on at least two colored samples having different numbers of ink dots discharged per unit area.

The ink discharge density, necessary for actually coloring a color filter, can be obtained by utilizing a regression equation of the amount (e.g. absorbance) representing the color density in a colored portion and the amount (ink discharge density) representing the number of ink dots discharged per unit area, which are measured in at least two colored samples having different ink discharge densities.

The at least two colored samples, having different ink discharge densities, provide an advantage such that an always-constant error component (e.g. an effect of absorbance in the background portion of the colored portion) and a random-varying error component (e.g. real-time variation of a discharge amount due to changes in nozzle state) are separably measured. The regression equation of the amount representing the color density in a colored portion (e.g. absorbance) and the amount representing the number of ink dots discharged per unit area (ink discharge density), has an effect of separating the influence of the always-constant error component and that of the random-varying error component, thus enabling to determine the number of ink dots discharged per unit area where there is no influence of these error components.

This will be described with reference to FIG. 9.

Figure 9:
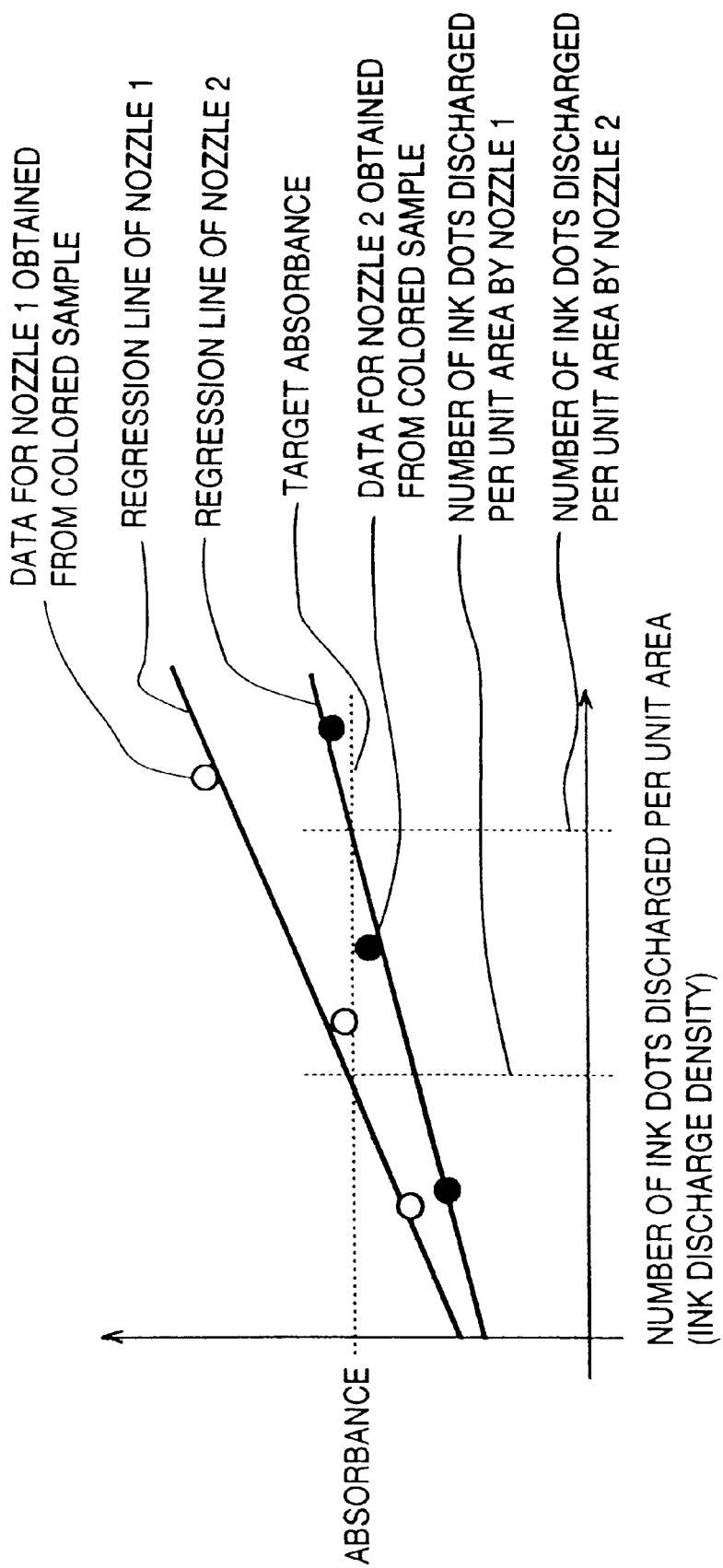
FIG. 9 is a graph used for determining the number of ink dots discharged per unit area.

FIG. 9 is a graph showing the relationship between the color density in a colored portion (herein expressed by absorbance) and the number of ink dots discharged per unit area (discharge density), which are measured in the colored samples having different ink discharge densities, and regression line thereof. Given the necessary color density, the ink discharge density to be used for actually coloring a color filter can be determined based on the points on the regression line.

According to the aforementioned Lambert-Beer's Law, the absorbance and the number of ink dots discharged per unit area (discharge density) are distributed on an approximately straight line. However, as has been described above, various errors are generated during measurement. Moreover, the always-constant error component (e.g. an effect of absorbance in the background portion of the colored portion) can be separated from the random-varying error component (e.g. variation of a real-time discharge amount due to changes in nozzle state).

Since the data for each nozzle in FIG. 9 is obtained at a different time, the value of absorbance (intercept y), obtained when the number of ink dots discharged per unit area is 0 in the regression line, is the always-constant error component; and the gap between the plotted point of each data and the regression line is the random-varying error component. It is apparent that, by finding an ink discharge density corresponding to a desired absorbance based on the points on the regression line shown in FIG. 9, it is possible to determine the correct number of ink dots discharged per unit area (ink discharge density) where there is no influence of the error components.

Note that although the ordinate indicates an absorbance and the abscissa indicates the number of ink dots discharged per unit area (discharge density) in FIG. 9, as long as the ordinate and abscissa indicate the amount representing the color density in a colored portion and the amount representing an ink amount per unit area respectively, the ink discharge density corresponding to the desired density in the colored portion can be similarly obtained. In this case, the regression equation may not form a straight line. Moreover, the number of ink dots discharged per unit area (discharge density) does not need to be an integer value.

Next, the method of determining the ink discharge density according to the present embodiment will be described in detail.

Figure 10:
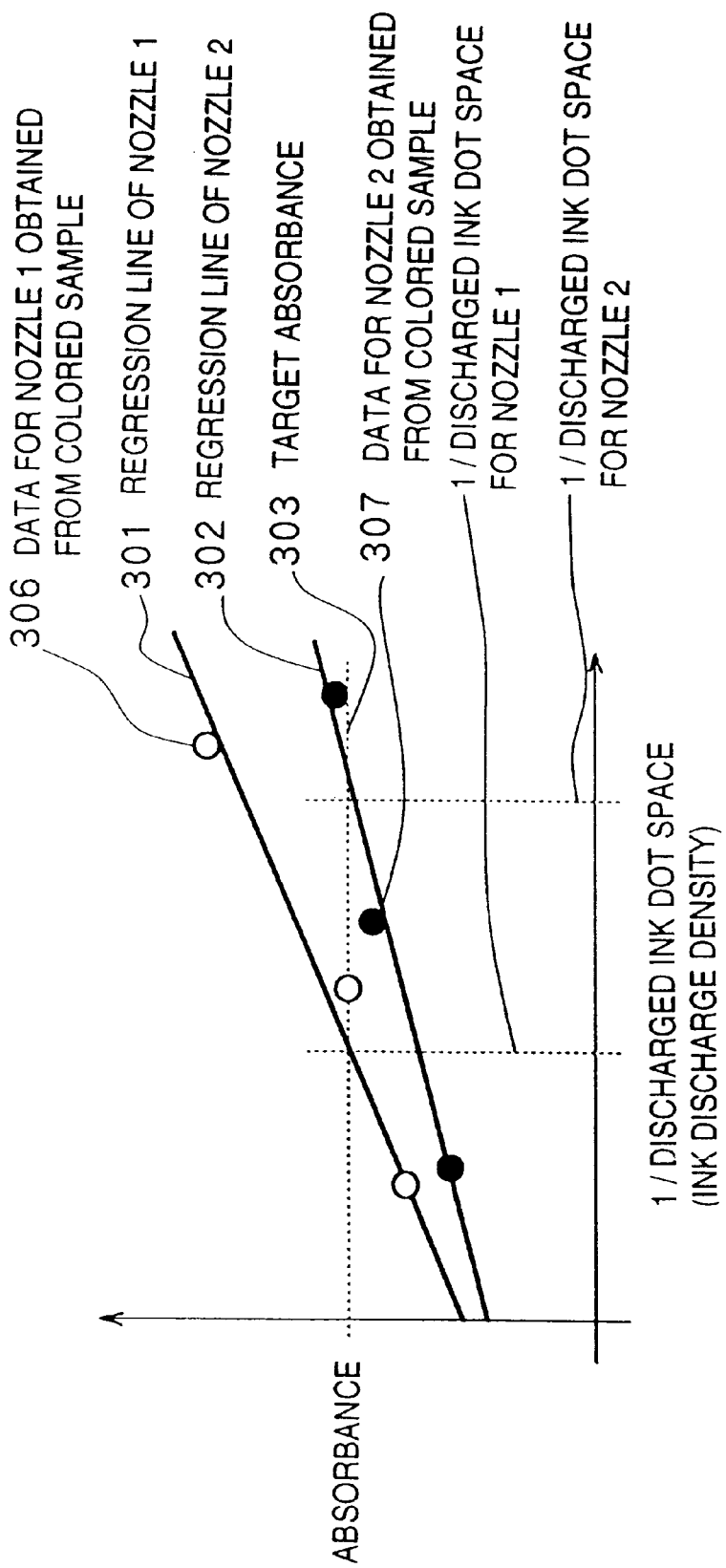
FIG. 10 is a graph used for determining the number of ink dots discharged per unit length based on absorbance and an inverse number of the discharged ink dot space.

FIG. 10 is a graph showing the relationship between the color density in a colored portion (herein expressed by absorbance) and the number of ink dots discharged per unit length (1/discharged ink dot space), which are measured by the colored samples having different ink discharge densities, and regression line thereof. Given the necessary color density, the ink discharge density to be used for actually coloring a color filter can be determined from the points on the regression line. FIG. 10 shows the case where two nozzles respectively use three samples. Note that in the example in FIG. 10, since ink is discharged on a straight line instead of being discharged on a two-dimensional plane, the ink discharge density is expressed by the number of ink dots discharged per unit length (1/discharged ink dot space).

Referring to FIG. 10, the abscissa indicates the number of ink dots discharged per unit length (discharge density); the ordinate indicates the absorbance in a colored portion; white points 306 denote data values for nozzle 1 obtained from the respective colored samples; and black points 307 denote data values for nozzle 2 obtained from the respective colored samples. The straight line 301 is a regression line of the nozzle 1 obtained by the above plotting and the straight line 302 is a regression line of the nozzle 2 obtained by the above plotting.

As can be seen from FIG. 10, by providing target absorbance 303, it is possible to find the number of ink dots discharged per unit length, which is suitable for each nozzle, based on the regression line of each of the nozzles.

Hereinafter, the method of obtaining each plot in FIG. 10 will be described.

<Method of Forming Colored Sample>

Figure 11:
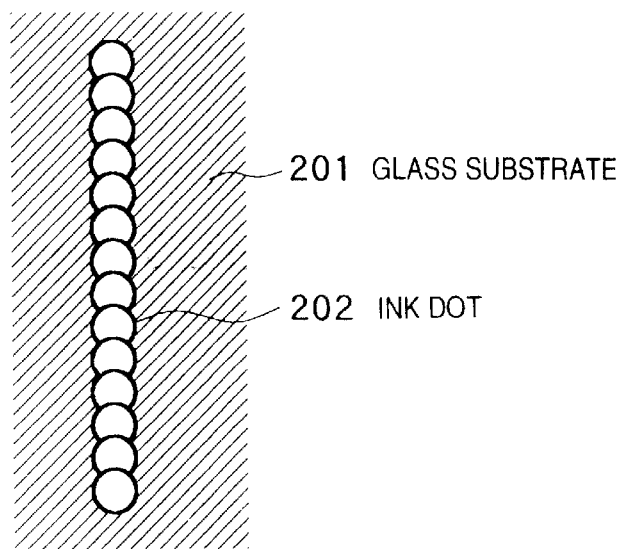
FIG. 11 is a schematic diagram of a colored sample.

As shown in FIG. 11, a linear pattern is formed on a glass substrate 201 on which an ink acceptance layer is coated as similar to a color filter. Although ink is illustrated by dots 202 in FIG. 11 in order to show the ink dots discharged by single discharge operation, on an actual color filter and colored sample, ink spreads so that the pattern forms a line on the whole.

Normally, it is preferable that the number of ink dots discharged per unit length (discharge density) for forming this line pattern is the same as that at the time of actual coloring of a color filter. To be more specific of the numerical value, in the case of a color filter for a liquid crystal display, it is preferable to discharge ink within the space between 10 $\mu$m to 300 $\mu$m; and it is preferable to discharge ink a single time, or discharge ink twice to ten times. Then, two or more colored samples, in which the discharged ink dot spaces are different within the above range, are generated.

<Method of Measuring Absorbance of Colored Sample>

Light emitted by the same light source is transmitted through the colored sample shown in FIG. 11, and in accordance with the Lambert-Beer's Law, absorbance of the colored portion where influence of the substrate is eliminated as much as possible is obtained by the following equation. Herein, the intensity of light transmitted through the colored portion is I, and the intensity of light transmitted through the uncolored portion is I0.

$$A = -\text{Log}(I/I0) = abc$$

A: absorbance

I0: intensity of incident light

I: intensity of transmitted light

I/I0: transmissivity

Note that although the absorbance is defined with respect to light of a single wavelength, light having some widths in the spectrum distribution may be used and an integrated value of each wavelength component may be employed.

Figure 12:
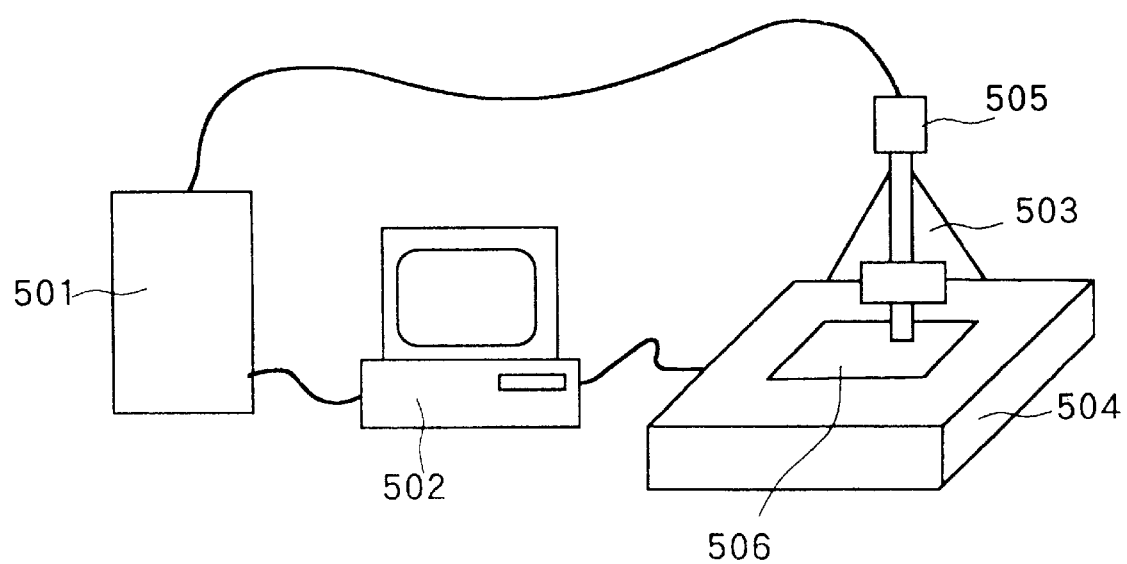
FIG. 12 is an explanatory view showing the structure of an apparatus for measuring the color density in a colored portion.

FIG. 12 is an explanatory view showing the structure of the above-described absorbance measurement apparatus. Note that although FIG. 12 shows the absorbance measurement apparatus independently, in reality, the measurement apparatus is integrated in the color-filter manufacturing apparatus shown in FIG. 1.

Referring to FIG. 12, reference numeral 501 denotes an image processing apparatus for measuring density; 502, a personal computer (hereinafter referred to as PC) for controlling the image processing apparatus 501 and XY control stage 504; 503, an optical microscope; 504, an XY control stage for consecutively measuring the density of measuring objects; 505, a color CCD camera for capturing an image of the measuring object into the image processing apparatus; and 506, a light source provided below the XY control stage 504. The center portion of the stage surface of the XY control stage 504 is made with glass, so that the measuring object is captured by the color CCD camera 505 by emitting light from the light source 506. The PC 502 controls the XY control stage 504 by utilizing an RS232C or GPIB interface, and controls the image processing apparatus 501.

<Adjustment Result>

Figure 13:
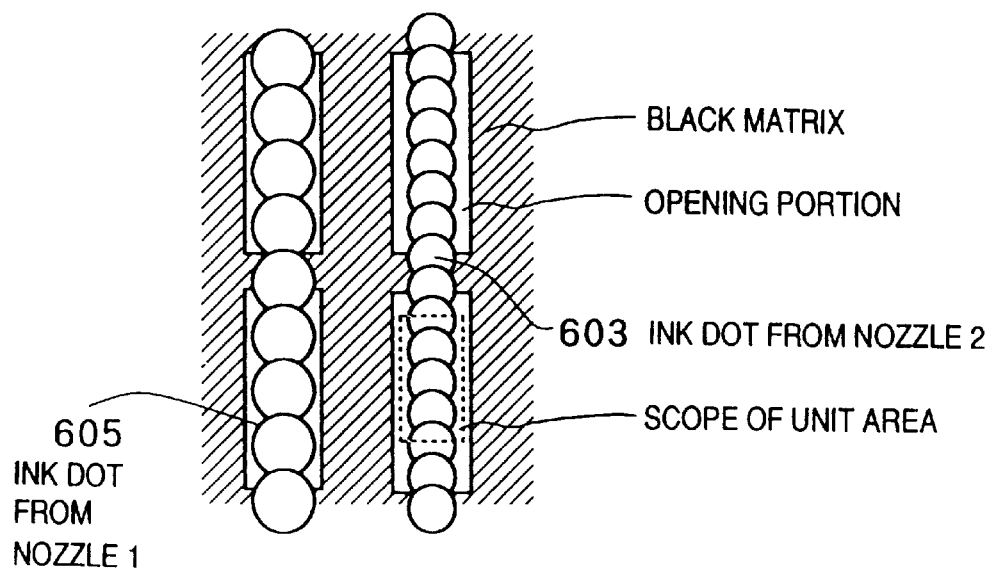
FIG. 13 is a schematic diagram of a color filter whose color unevenness is corrected.

FIG. 13 shows a plan view of a color filter, where color unevenness on the screen is corrected, colored in accordance with the number of ink dots discharged per unit length (ink discharge density) which is determined based on the graph shown in FIG. 10.

Referring to FIG. 13, an ink dot 605 on the left side corresponds to ink discharged by the nozzle 1 in FIG. 10; and an ink dot 603 on the right side corresponds to ink discharged by the nozzle 2 in FIG. 10. As can be seen, in a case of utilizing a nozzle whose amount of ink discharged per single discharge operation is large, the number of ink dots discharged per unit length (discharge density) is decreased; whereas in a case of utilizing a nozzle whose amount of ink discharged per single discharge operation is small, the number of ink dots discharged per unit length (discharge density) is increased. By this, a color filter without color unevenness can be produced.

Furthermore, although FIG. 13 shows the state where pixels of the same color are arrayed, in reality, it is normal that a pixel of another color is situated between pixels colored by the nozzle 1 and pixels colored by the nozzle 2.

In the present embodiment, ink dots are linearly arrayed and coloring is performed, then the space between the linear-arrayed ink dots is adjusted. However, it is possible to determine the number of ink dots discharged per unit area, even in a case where coloring is performed on a black matrix substrate, or where coloring is performed on a glass substrate on which an ink acceptance layer is coated and a linear mask pattern is exposed thereupon to control the line width, or where ink dots are not arrayed linearly. In this case, it is preferable that the ink dots are arrayed in the colored sample in the manner same as the ink dots array in the color filter; however, it would not be problematic if they are different.

<Second Embodiment>

With respect to the method described in the first embodiment for reducing color unevenness of a color filter by changing the ink discharge density, the second method for determining the ink discharge density will be described next. Note that the color filter manufacturing apparatus, and the apparatus for measuring the color density in the colored portion used herein are the same as those used in the first embodiment.

The density at which ink is discharged on a color filter substrate is determined by the following method.

Figure 14:
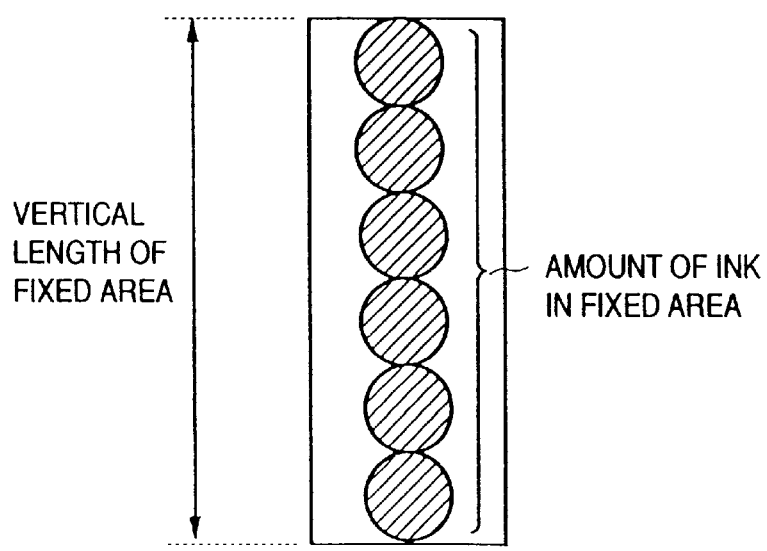
FIG. 14 is an explanatory view showing the amount of ink in a fixed area.

On a color filter substrate, which has a sill or a water-repellent portion formed around pixels so that ink discharged on pixels do not spread out, the amount of ink on a pixel can be expressed by the following equation, utilizing the amount of ink in a fixed area (see FIG. 14).

amount of ink in a fixed area=amount of ink per single discharge×
ink discharge density×vertical length of the fixed area (1)

If the amount of ink in the fixed area is set and the amount of ink per single discharge operation of each nozzle is obtained, the ink discharge density for each nozzle can be obtained.

Next, description will be provided for measuring the amount of ink by the absorbance method.

The absorbance method is an effective technique of chemical analysis for measuring the density of dye in a solution.

Figure 15:
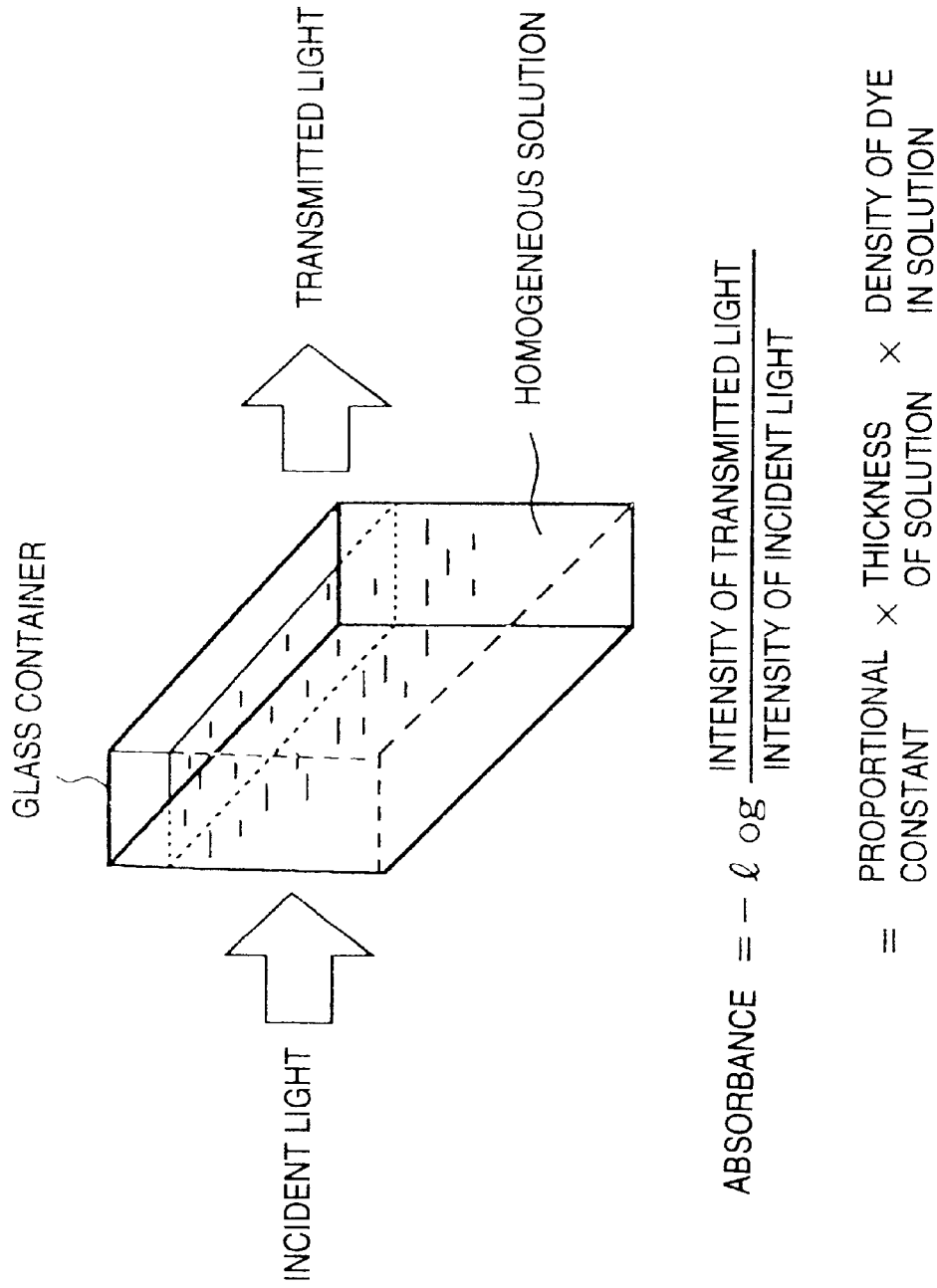
FIG. 15 is an explanatory view showing the method of measuring absorbance.

The absorbance method is described briefly. Monochromatic light is irradiated on a glass container containing a homogeneous solution (FIG. 15), and the intensity of light incident on the glass container and the intensity of transmitted light are measured.

These intensities are expressed as follows according to Lambert-Beer's Law.

$$A = -\mathrm{Log}(I/I0) = abc$$

A: absorbance
I0: intensity of incident light
I: intensity of transmitted light
I/I0: transmissivity
a: proportional constant
b: thickness of solution
c: density of dye in solution Herein, assuming that the density of dye in the solution is constant, the following relationship is found:

$$\text{absorbance} = \text{proportional constant} \times \text{thickness of solution}$$

From the above relationship, considering the thickness of solution as the amount of ink on a pixel, absorbance is obtained by the following measuring operation.

Light is irradiated on the colored portion of the transparent substrate, and the intensity of light incident on the colored portion and the intensity of light transmitted through the colored portion are measured by the absorbance measurement apparatus (shown in FIG. 12). By this, the absorbance of the colored portion is obtained.

Theoretically, the following relationship should be satisfied:

$$\text{absorbance} = \text{proportional constant} \times \text{amount of ink in a fixed area}$$

However, since the actual measurement includes errors, the absorbance (in the area where necessary measurement is actually performed) can be expressed by the following relationship equation:

$$\text{absorbance} = \text{proportional constant} \times \text{amount of ink in a fixed area} + \text{constant}$$

Substituting this equation for the above-described equation (1), the following equation is obtained:

$$\text{absorbance in a fixed area} = \text{constant } a \times \text{absorbance per single discharge} \times \text{ink discharge density} + \text{constant } b \quad (2)$$

Assuming that the absorbance in a fixed area is y and the ink discharge density is x, equation (2) is a simple binary linear equation where constant a×absorbance per single discharge operation represents the gradient and constant b represents the intercept y. In other words, $$\text{absorbance in a fixed area} = (\text{gradient}) \times \text{ink discharge density} + (\text{intercept } y) \quad (3)$$

Figure 16:
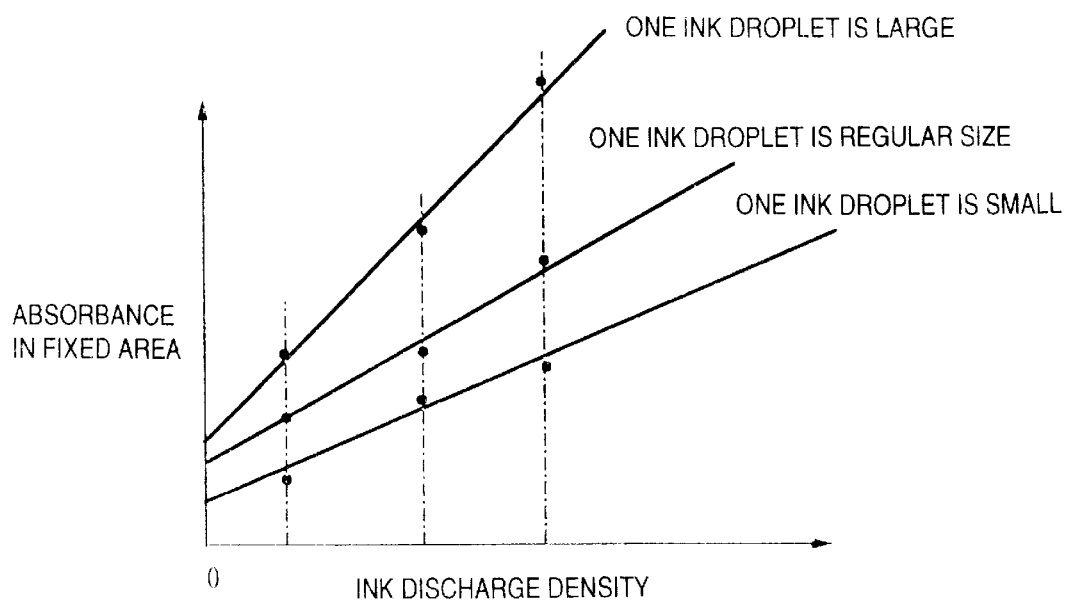
FIG. 16 is a graph representing the relationship equation of the absorbance in a fixed area and ink discharge density.

Then, coloring is performed while changing the ink discharge density twice or more, and the absorbance of two or more colored samples are measured. As a result, the gradient of equation (3) (constant a×absorbance per single discharge operation) and intercept y in equation (3) (constant b) can be obtained as shown in FIG. 16. In other words, the relationship equation between the absorbance in a fixed area and ink discharge density can be obtained for each nozzle.

Note that in a case where the ink discharge density is changed three times or more to obtain the gradient and intercept y in equation (3), various errors are generated (e.g. real-time variation in the amount of discharge due to the influence of absorbance in a background portion of the colored portion or changes in the nozzle state) and the values do not form a linear line. Therefore, a regression line is utilized.

At this stage, the gradient and intercept y in equation (3) can be obtained simultaneously for each nozzle by performing a coloring operation with a plurality of nozzles.

If a target absorbance is set, the ink discharge density for each nozzle can be obtained by utilizing the obtained equation.

Since the gradient of equation (3) is constant a×absorbance per single discharge, the gradient is obtained if absorbance per single discharge operation is given. Moreover, the absorbance per single discharge operation has an approximately proportional relationship with the absorbance of a predetermined ink discharge density (e.g. discharging 1000 dots of ink within a width of 10 mm). Therefore, the gradient of equation (2) may be considered as constant c×absorbance of the predetermined ink discharge density.

Figure 17:
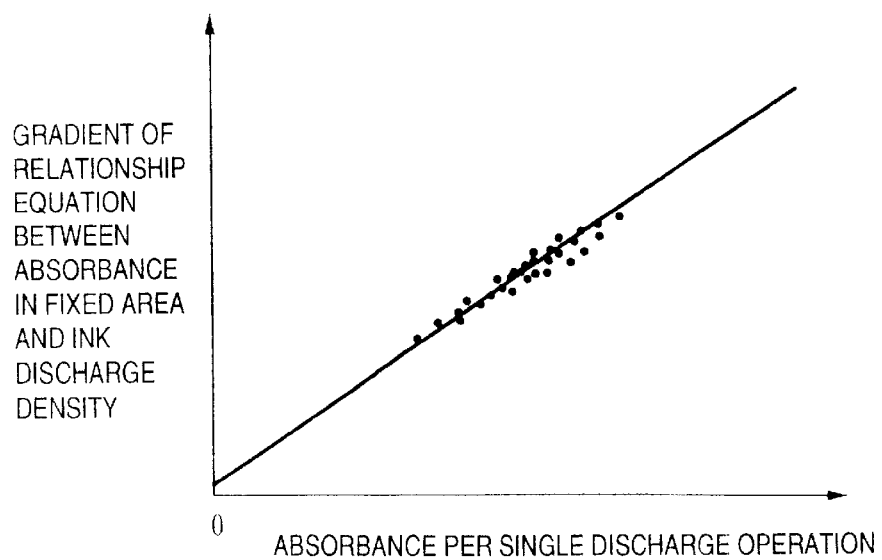
FIG. 17 is a graph representing the relationship equation of a gradient of the relationship equation between the absorbance in a fixed area and ink discharge density, and absorbance per single discharge operation.

More specifically, although the absorbance of the predetermined ink discharge density and the gradient of equation (3) have a proportional relationship, in reality, the relationship equation is obtained by utilizing the regression line as shown in FIG. 17.

By making use of this relationship, the gradient of equation (3) can be obtained by performing coloring at the predetermined ink discharge density and measuring the absorbance. Then, by substituting the predetermined ink discharge density and absorbance of the predetermined ink discharge density into equation (3), the intercept y in equation (3) is obtained.

The constant portion of equation (3) can be obtained in the foregoing manner, while the ink discharge density for each nozzle can be obtained by substituting a value of a target absorbance for the absorbance in the fixed area represented by value y.

Note that the present invention is applicable to a corrected or modified embodiment of the above-described embodiment without departing from the spirit of the present invention.

Note that although the description has been given in the above-described embodiments that the amount of ink discharged is obtained based on the density of an ink dot formed with discharged ink, the amount of ink discharged may be obtained based on a diameter of the ink dot.

The present invention employs a printing apparatus which comprises means (e.g., an electrothermal transducer, laser beam generator and the like) for generating heat energy as energy utilized upon execution of ink discharge, and causes a change in state of ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of a plurality of electrothermal transducers arranged in correspondence to a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence to a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In additions not only an exchangeable chip type printhead, as described in the above embodiment, which can be electrically connected to the apparatus main unit and can receive ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in the above-mentioned embodiments of the present invention, it is assumed that the ink is liquid. Alternatively, the present invention may employ ink which is solid at room temperature or less, or ink which softens or liquefies at room temperature, or ink which liquefies upon application of a printing signal.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In this case, ink may be situated opposite to electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned ink.

As has been set forth above, according to the present invention, it is possible to eliminate the influence of various errors in measurement and manufacture of a color filter without color unevenness.

Moreover, by finding the relationship between the absorbance of the predetermined ink discharge density (discharge amount) and the gradient of equation (3), a given amount of ink discharged per single discharge operation of each nozzle enables to precisely and efficiently obtain a straight line indicative of the relationship between the absorbance and ink discharge density for each nozzle.

The present invention is not limited to the above embodiments and various changes and modifications can be made within the spirit and scope of the present invention. Therefore, to apprise the public of the scope of the present invention, the following claims are made.

What is claimed is:

1. A method of manufacturing a color filter by scanning an ink-jet head relative to a color filter substrate and discharging ink from the ink-jet head onto the color filter substrate to color the color filter substrate, comprising:
   a measuring step comprised of determining at least two different ink discharge densities, coloring a coloring-target medium, using the at least two different ink discharge densities, and measuring color densities of colored portions of the coloring-target medium;
   an operation step of obtaining a relationship between color density and ink discharge density based on the respective color densities of the colored portions colored by the at least two different ink discharge densities and corresponding ink discharge densities; and
   a coloring step comprised of determining an ink discharge density which attains a desired color density based on the obtained relationship between color density and ink discharge density, and discharging ink onto the color filter substrate at the determined ink discharge density, thereby coloring the color filter substrate.

2. The method according to claim 1, wherein the color density is expressed by absorbance of the colored portions of the coloring-target medium, and the ink discharge density is expressed by an inverse number of a discharged ink dot space.

3. The method according to claim 1, wherein in said operation step, a curve representing the relationship between color density and ink discharge density is obtained.

4. The method according to claim 3, wherein the curve representing the relationship between color density and ink discharge density is obtained by obtaining a regression curve of points indicative of the respective color densities of the colored portions colored by the at least two different ink discharge densities and corresponding ink discharge densities.

5. The method according to claim 4, wherein the regression curve is a straight line.

6. The method according to claim 1, wherein the inkjet head is a printhead which discharges ink by utilizing heat energy, and includes heat energy transducers for generating heat energy to be applied to the ink.

7. A method of manufacturing a color filter by scanning an ink-jet head relative to a color filter substrate and discharging ink from the ink-jet head onto the color filter substrate to color the color filter substrate, comprising:

a measuring step of obtaining a relationship between a gradient of a straight line, representing a relationship between an amount of ink discharged in a fixed area and ink discharge density, and an amount of ink discharged per single discharge operation of the ink-jet head;

an operation step of obtaining an ink discharge density necessary for coloring the color filter substrate based on the result of measuring the amount of ink discharged per single discharge operation of each ink discharge nozzle of the ink-jet head and the relationship between the gradient and the amount of ink discharged obtained in said measuring step; and a coloring step of discharging ink onto the color filter substrate while changing the ink discharge density for each nozzle of the ink-jet head based on the ink discharge density obtained in said operation step, thereby coloring the color filter substrate.

8. The method according to claim 7, wherein in said measuring step, a relationship between a gradient of a straight line, representing a relationship between absorbance of a colored portion formed with ink discharged in a fixed area and ink discharge density, and the amount of ink discharged per single discharge operation, is obtained, and in said operation step, an absorbance of an ink dot formed with ink discharged per single discharge operation of each ink discharge nozzle of the ink-jet head is obtained.

9. The method according to claim 7, wherein in said measuring step, a relationship between a gradient of a straight line, representing a relationship between an amount of ink discharged in a fixed area and ink discharge density, and a diameter of an ink dot formed with ink discharged per single discharge operation, is obtained, and in said operation step, a diameter of an ink dot formed with ink discharged per single discharge operation of each ink discharge nozzle of the ink-jet head is obtained.

10. The method according to claim 7, wherein the inkjet head is a printhead which discharges ink by utilizing heat energy, and includes heat energy transducers for generating heat energy to be applied to the ink.

11. An apparatus for manufacturing a color filter by scanning an ink-jet head relative to a color filter substrate and discharging ink from the ink-jet head onto the color filter substrate to color the color filter substrate, comprising:

measuring means for determining at least two different ink discharge densities, coloring a coloring-target medium, using the at least two different ink discharge densities, and measuring color densities of colored portions of the coloring-target medium;

operation means for obtaining a relationship between color density and ink discharge density based on the respective color densities of the colored portions colored by the at least two different ink discharge densities and corresponding ink discharge densities; and coloring means for determining an ink discharge density which attains a desired color density based on the obtained relationship between color density and ink discharge density, and discharging ink onto the color filter substrate at the determined ink discharge density, thereby coloring the color filter substrate.

12. The apparatus according to claim 11, wherein the color density is expressed by absorbance of the colored portions of the coloring-target medium, and the ink discharge density is expressed by an inverse number of a discharged ink dot space.

13. The apparatus according to claim 11, wherein said operation means obtains a curve representing the relationship between color density and ink discharge density.

14. The apparatus according to claim 13, wherein the curve representing the relationship between color density and ink discharge density is obtained by obtaining a regression curve of points indicative of the respective color densities of the colored portions colored by the at least two different ink discharge densities and corresponding ink discharge densities.

15. The apparatus according to claim 14, wherein the regression curve is a straight line.

16. The apparatus according to claim 11, wherein the ink-jet head is a printhead which discharges ink by utilizing heat energy, and includes heat energy transducers for generating heat energy to be applied to the ink.

17. An apparatus for manufacturing a color filter by scanning an ink-jet head relative to a color filter substrate and discharging ink from the ink-jet head onto the color filter substrate to color the color filter substrate, comprising:

measuring means for obtaining a relationship between a gradient of a straight line, representing a relationship between an amount of ink discharged in a fixed area and ink discharge density, and an amount of ink discharged per single discharge operation of the ink-jet head;

operation means for obtaining an ink discharge density necessary for coloring the color filter substrate based on the result of measuring the amount of ink discharged per single discharge operation of each ink discharge nozzle of the ink-jet head and the relationship between the gradient and the amount of ink discharged obtained by said measuring means; and coloring means for discharging ink onto the color filter substrate while changing the ink discharge density for each nozzle of the ink-jet head based on the ink discharge density obtained by said operation means, thereby coloring the color filter substrate.

18. The apparatus according to claim 17, wherein said measuring means obtains a relationship between a gradient of a straight line, representing a relationship between absorbance of a colored portion formed with ink discharged in a fixed area and ink discharge density, and the amount of ink discharged per single discharge operation, and said operation means obtains an absorbance of an ink dot formed with ink discharged per single discharge operation of each ink discharge nozzle of the ink-jet head.

19. The apparatus according to claim 17, wherein said measuring means obtains a relationship between a gradient of a straight line, representing a relationship between an amount of ink discharged in a fixed area and ink discharge density, and a diameter of an ink dot formed with ink discharged per single discharge operation, and said operation means obtains a diameter of an ink dot formed with ink discharged per single discharge operation of each ink discharge nozzle of the ink-jet head.

20. The apparatus according to claim 17, wherein the ink-jet head is a printhead which discharges ink by utilizing heat energy, and includes heat energy transducers for generating heat energy to be applied to the ink.

* * * * *

UNITED STATES PATENT AND TRADEMARK OFFICE
CERTIFICATE OF CORRECTION

PATENT NO.   : 6,158,858
DATED        : December 12, 2000
INVENTOR(S)  : FUJIKE ET AL.

It is certified that error appears in the above-identified patent and that said Letters Patent is hereby corrected as shown below:

COLUMN 1:
  Line 59, " "be" in " should read --"bc" in--.

COLUMN 4:
  Line 34, "coloring" should read --a coloring--.

COLUMN 7:
  Line 23, "inkjet" should read --ink-jet--.

COLUMN 17:
  Line 41, "additions" should read --addition,--.

COLUMN 19:
  Line 1, "inkjet" should read --ink-jet--.

Signed and Sealed this

Fifth Day of June, 2001

*Attest:*

*Attesting Officer*

NICHOLAS P. GODICI
*Acting Director of the United States Patent and Trademark Office*